(12) United States Patent
Moreno

(10) Patent No.: US 7,065,544 B2
(45) Date of Patent: Jun. 20, 2006

(54) SYSTEM AND METHOD FOR DETECTING REPETITIONS IN A MULTIMEDIA STREAM

(75) Inventor: Pedro J. Moreno, Cambridge, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 602 days.

(21) Appl. No.: 09/997,731

(22) Filed: Nov. 29, 2001

(65) Prior Publication Data

US 2003/0101144 A1    May 29, 2003

(51) Int. Cl.
*G06F 17/15* (2006.01)

(52) U.S. Cl. .................................................. 708/422

(58) Field of Classification Search ........ 708/422–426; 704/200, 246, 244
See application file for complete search history.

(56) References Cited

U.S. PATENT DOCUMENTS

| | | | | |
|---|---|---|---|---|
| 3,919,479 A | * | 11/1975 | Moon et al. ................. | 704/237 |
| 4,112,496 A | * | 9/1978 | Stevens ....................... | 708/422 |
| 4,282,403 A | * | 8/1981 | Sakoe .......................... | 704/234 |
| 4,450,531 A | * | 5/1984 | Kenyon et al. ................ | 708/5 |
| 4,570,232 A | * | 2/1986 | Shikano ....................... | 704/241 |
| 4,843,562 A | * | 6/1989 | Kenyon et al. ................ | 708/5 |
| 5,210,820 A | * | 5/1993 | Kenyon ........................ | 704/200 |
| 5,313,556 A | * | 5/1994 | Parra ........................... | 704/246 |
| 5,512,933 A | * | 4/1996 | Wheatley et al. .............. | 725/19 |
| 5,694,474 A | * | 12/1997 | Ngo et al. .................... | 708/322 |
| 5,864,807 A | * | 1/1999 | Campbell et al. ............. | 704/244 |
| 6,192,337 B1 | * | 2/2001 | Ittycheriah et al. .......... | 704/231 |
| 6,513,161 B1 | * | 1/2003 | Wheeler et al. ............... | 725/14 |
| 6,801,895 B1 | * | 10/2004 | Huang et al. ................. | 704/246 |

OTHER PUBLICATIONS

Moreno, P.J., and Rifkin, R. , "Using The Fisher Kernel Method For Web Audio Classification," Paper presented at the IEEE International Conference on Acoustics, Speech and Signal Processing, ICASSP2000, Istanbul, Turkey, (Jun. 6, 2000), pp. 2417-2420.

(Continued)

*Primary Examiner*—Kakali Chaki
*Assistant Examiner*—Chat C. Do
(74) *Attorney, Agent, or Firm*—Richard P. Lange

(57) ABSTRACT

Large amounts of multimedia data are transmitted over information networks in the form of a digital stream, analog video, or text captioning. Often, repetitions such as paid advertisements, theme music at the commencement of a TV broadcast, and common jingles and slogans occur in these streams. Detection of repetitions in a transmitted signal such as streaming audio or video is described, and includes extracting a plurality of samples from the information stream and accumulating the samples into segments comprising an interval of the transmitted signal. A vector indicative of the samples in each of the segments is generated, and each of the vectors in the segments is correlated to generate a covariance matrix, or signature, corresponding to the segment. Each of the covariance matrices are aggregated into a sequence of covariance matrices and compared to other covariance matrices to generate a distance matrix. The distance matrix includes a distance value, indicative of the similarity between the distance matrices, as a result of the comparing of each matrix. The distance matrix is then traversed to determine similar sequences of covariance matrices.

28 Claims, 7 Drawing Sheets

OTHER PUBLICATIONS

Johnson, S. E., and Woodland, P. C., "A Method For Direct Audio Search With Applications To Indexing And Retrieval," Paper presented at the IEEE International Conference on Acoustics, Speech and Signal Processing, ICASSP2000, Istanbul, Turkey, (Jun. 7, 2000), pp. 1427-1430.

* cited by examiner

SYSTEM AND METHOD FOR DETECTING REPETITIONS IN A MULTIMEDIA STREAM

BACKGROUND OF THE INVENTION

Multimedia information streams such as streaming audio, video, and text are commonplace with the proliferation of information disseminated and available over information networks such as the Internet, telephone, cable TV, and wireless mediums. Massive amounts of multimedia data are transmitted over such networks, in the form of a digital stream, analog video, or text captioning, for example. Often, repetitions or near-repetitions of such data occur in these streams. Repetitions include transmissions such as paid advertisements, theme music at the commencement of a TV broadcast, and common jingles and slogans that may accompany transmissions from a common source.

Large amounts of multimedia data may be gathered by applications which store and process such data, such as SpeechBot™ and Mediaworqs™, for example. Repetitive transmissions can consume storage and computation resources redundantly if not detected. Also, processing of transmitted information, such as tracking paid advertisements to ensure frequency and duration, is typically performed by manually observing such multimedia transmissions. Detection and elimination or processing of repetitions can conserve resources, aid in tracking transmission patterns, and serve as building blocks for further processing. Accordingly, it would be beneficial to monitor and detect repetitions in a multimedia information stream to allow selective processing according to a specific application. One prior art technique for exact match audio detection is disclosed in Johnson, et al., "A Method for Direct Audio Search with Applications to Indexing and Retrieval," IEEE International Conference on Audio, Speech and Signal Processing (ICASSP 2000), Jun. 5–9, 2000. Johnson, however, discloses a system which looks to a single vector derived from a portion of audio in relation to another single vector.

SUMMARY OF THE INVENTION

A method of detecting repetitions in an information stream of A/V (audio visual) data from a transmitted signal such as streaming audio or video includes extracting a plurality of samples from the information stream and accumulating the samples into segments comprising a predetermined interval of the transmitted signal. Vectors indicative of samples in respective segments are generated, and each of the vectors in the segments is correlated to generate a covariance matrix corresponding to the segment. The covariance matrices are aggregated into a sequence of covariance matrices and compared to each other covariance matrix in the sequence to generate a distance matrix. The distance matrix includes a distance value, indicative of the similarity between the covariance matrices, as a result of the comparing of each covariance matrix. The distance matrix is then traversed to determine similar sequences of covariance matrices, wherein determining similar sequences comprises searching for diagonals of similar distance values.

The distance matrix, therefore, contains a distance value for each pair of covariance matrices compared. A relatively low distance value between the two covariance matrices is indicative of a high degree of similarity. A sequence of relatively low distance values shows a repetition in the transmitted signal for an interval such as commercials, for example. Each segment represents a relatively small time interval so as to provide a high degree of granularity for the detection of repeated portions. Detection of repetitions, or duplicates, may include identification of near-duplicates which appear only slightly different due to sampling intervals or distortion. The higher granularity serves to ensure that the interval represented does not overlap with the start or the end of the duplicate segment by only partial overlap. Graphically, such repetitions are represented as a diagonal in the distance matrix since they represent a contiguous sequence of time intervals corresponding to the compared matrices.

Found repetitions are stored in a library database for comparison with other information streams. The stream of samples is compared to itself and to the previously found repetitions in the library. A repository of candidates of likely repetitions is therefore maintained in the database. Matches may be either a new match or an instantiation of a previously found match. If a found sequence is a repeat of a previously found match, a timestamp associated with the library entry is updated. The library database is periodically scanned and entries older than a predetermined threshold are purged. The library is therefore limited to a manageable size by purging stale entries and refreshing current ones.

In this manner, repetitions of transmitted data may be detected and handled efficiently by ignoring, capturing, or otherwise processing the repetitions to conserve computing resources and avoid delays and interruptions resulting from undesired repetitions in the transmitted stream.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

A multimedia stream including audio, video, and text may contain repetitions of material such as advertisements and slogans. Identification of repeated material, or portions thereof, can allow the duplications to be removed or otherwise processed to avoid expending unnecessary computing resources to process the repeated material. Further, detection of repetitions may include identification of near-duplicates which appear only slightly different due to sampling intervals or distortion, and which otherwise represent the same information stream.

Figure 1:
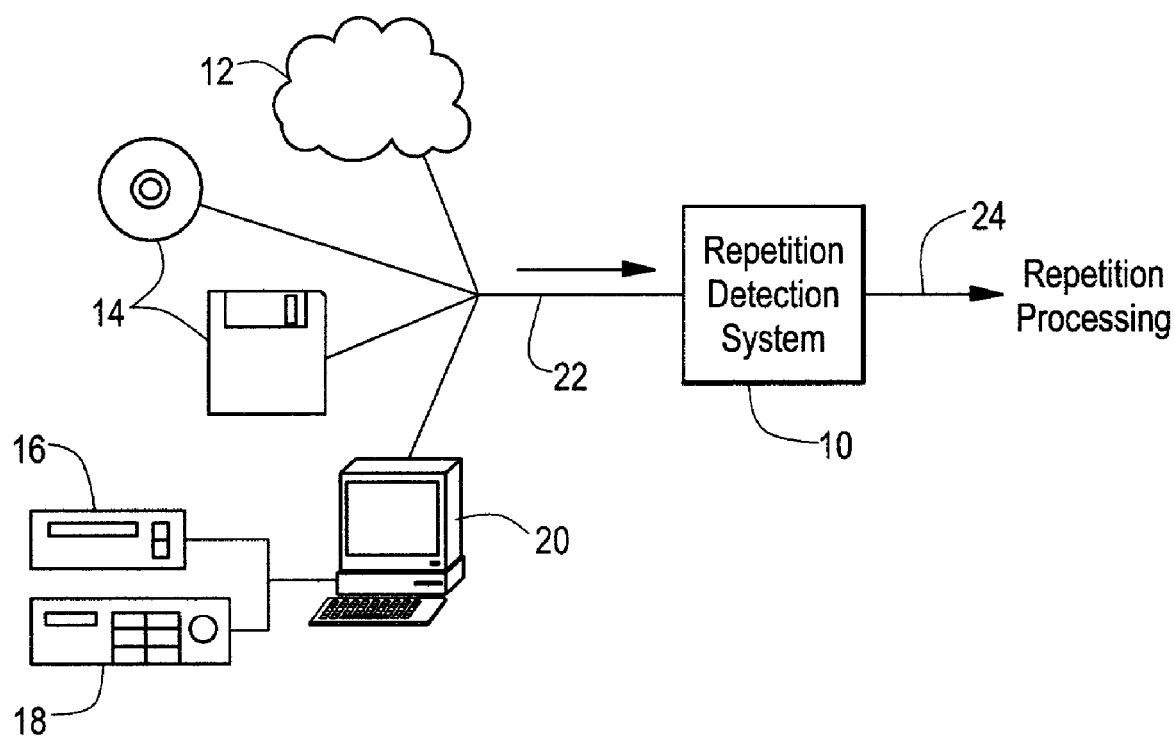
FIG. 1 is a context diagram of the repetition detection system as defined herein.

FIG. 1 shows a context diagram of the repetition detection system as defined herein. Referring to FIG. 1, the repetition detection system 10 receives a multimedia transmission stream 22 from a variety of sources, such as the Internet 12, magnetic or optical media 14, video recorder 16, or RF broadcasts from a receiver 18 via a PC 20. The transmission stream 22 may include video, audio, text, or a combination of these and other information carriers. The multimedia stream 22 is processed by the repetition detection system 10, which outputs an indication of the repetitions 24 for subsequent repetition processing. The repetition processing may include, for example, termination or skipping processing for duplicate portions, or recording frequency of occurrences of repetitions, for tracking purposes, loading a VCR compatible library module for advertisement detection, and the like.

Figure 2:
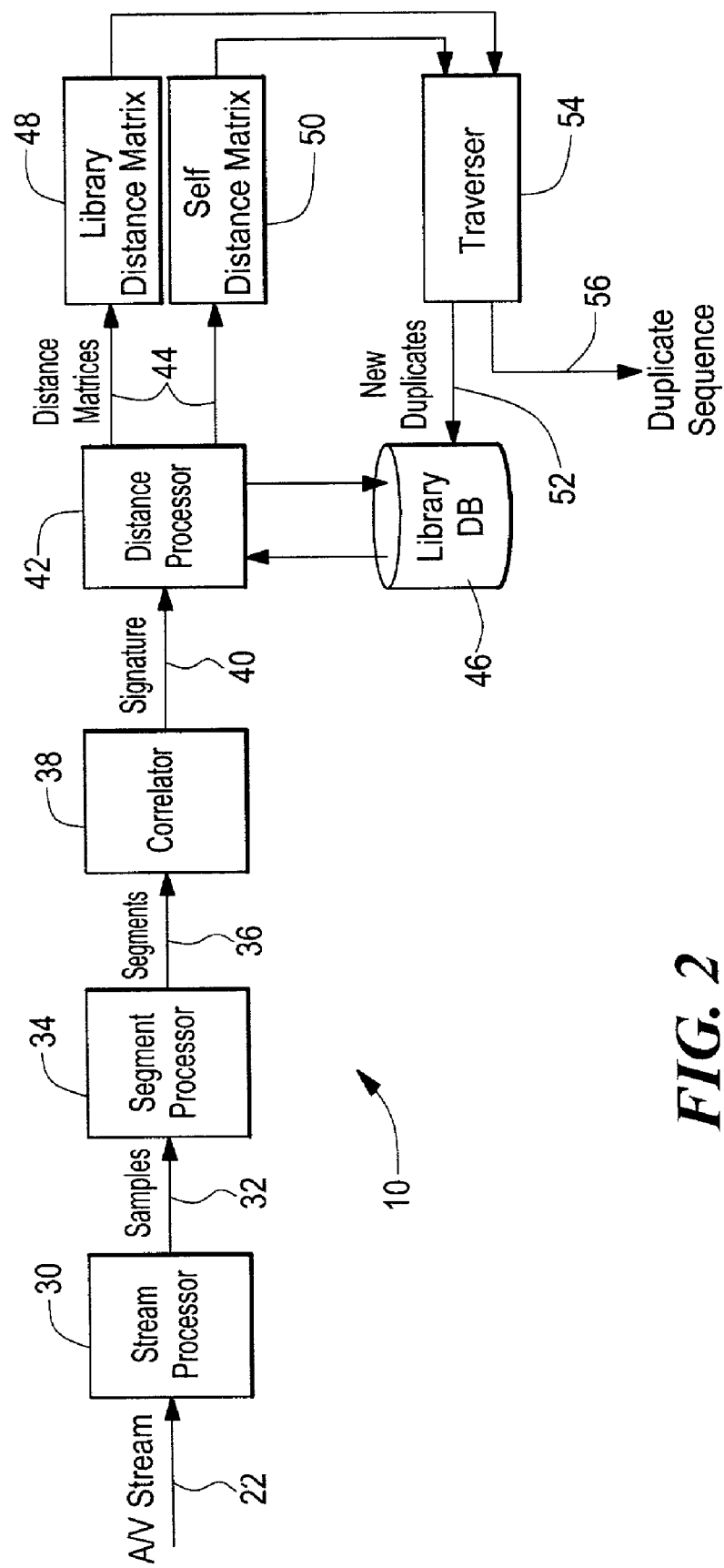
FIG. 2 is a block diagram of the repetition detection system of the present invention.

FIG. 2 shows a block diagram of the detection repetition system 10. Referring to FIG. 2, the audio/visual (A/V) transmission stream 22 of multimedia data is received by a stream processor 30. The stream processor 30 subdivides the A/V stream 22 into samples 32 of the transmitted signal, each of a predetermined duration, or sampling interval. In a particular embodiment, a sampling interval is 20 µs, for example, but may be varied to suit a particular application. The samples 32 are sent to a segment processor 34, which accumulates samples 32 into segments representing an interval of 0transmission time. The segment processor 34 converts each sample 32 in the segment into a feature vector indicative of the transmitted signal over the sampling interval for each sample included in a segment. Each of the segments 36, therefore, comprises a set of vectors, or sequence vector set, corresponding to an interval of transmission time. In a particular embodiment, the transmission interval is 5 seconds, but may be varied according to the desired granularity, as will be described further below.

The segments 36 are sent to a correlator 38, which computes a covariance matrix, or signature 40, by correlating the vectors in the segment 36. Each of the signatures 40, therefore, tends to be uniquely indicative of the corresponding portion of the transmitted signal for the segment 36 (transmission interval). The signatures 40 are received by a distance processor 42, which determines signatures that are similar by comparing them to other signatures. Similarity is determined by computing a distance between signatures in the multidimensional space corresponding to the vectors. A library database 46 stores sequences which have previously found to be repeated, and which are therefore deemed to be likely candidates for further repetition, described further below. In a particular embodiment, the vectors correspond to a 39 dimensional space commonly employed for audio signals. More dimensions would typically be employed with a video signal, for example.

The distance processor 42 determines a measure of similarity between signatures 40, and generates distance matrices 44, described further below. The distance matrices 44 contain entries of the distance between signatures 40, or covariance matrices, generated from the transmission stream 22. A self distance matrix 50 and a library distance matrix 48 are generated. The self distance matrix 50 stores the distance values between signatures from the transmission stream 22 compared to itself. The library distance matrix 48 stores distance values between signatures 40 from the transmission stream 22 and signatures from known repetitive sequences stored in the library DB 46. A traverser 54 receives the self distance matrix 50 and the library distance matrix 48, and identifies repetitions by searching for sequential entries of low distance values.

Once identified, new repetitions are stored in the library database 46 for use in successive distance matrices. A timestamp value ensures that stale entries are purged and frequently found sequences remain, so that the library 46 does not grow excessively large. The found duplicate sequences 56 are employed for successive processing applications, such as elimination of advertisements and tracking cycles of paid transmissions, for example. Also, new duplicates 52 are stored in the library 46 for use with successive transmission streams 22.

Figure 3A:
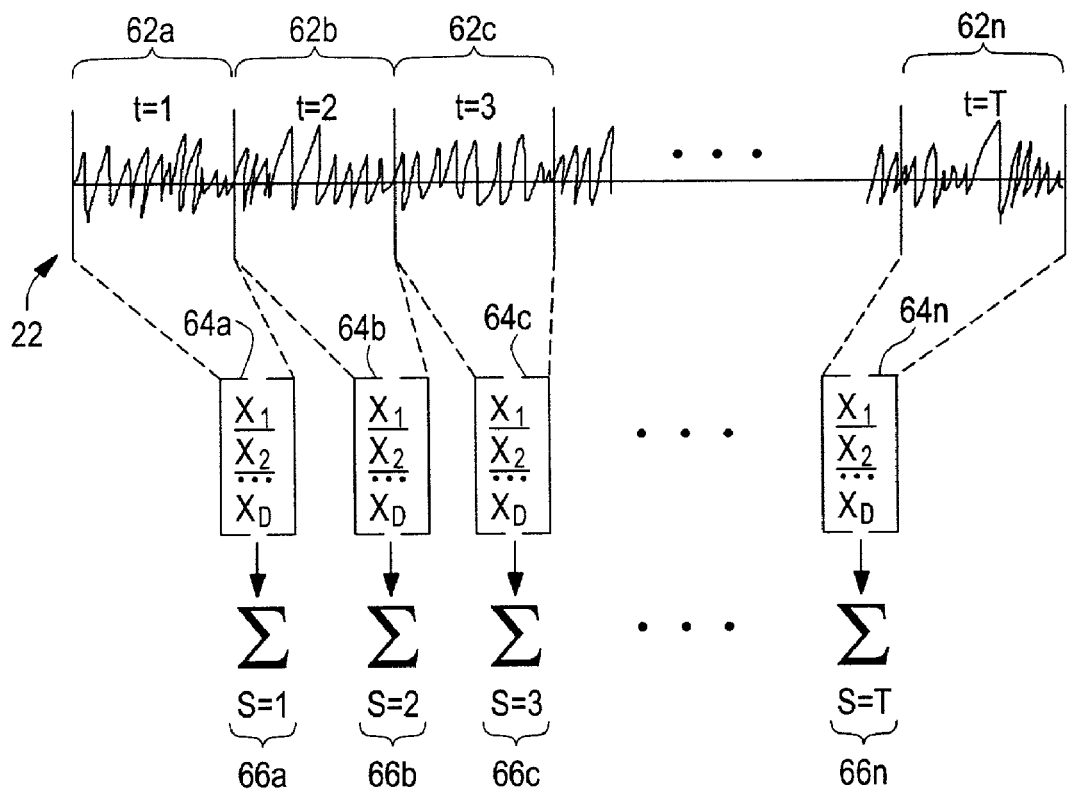
FIGS. 3a and 3b are schematic diagrams of covariance matrix processing.
Figure 3B:
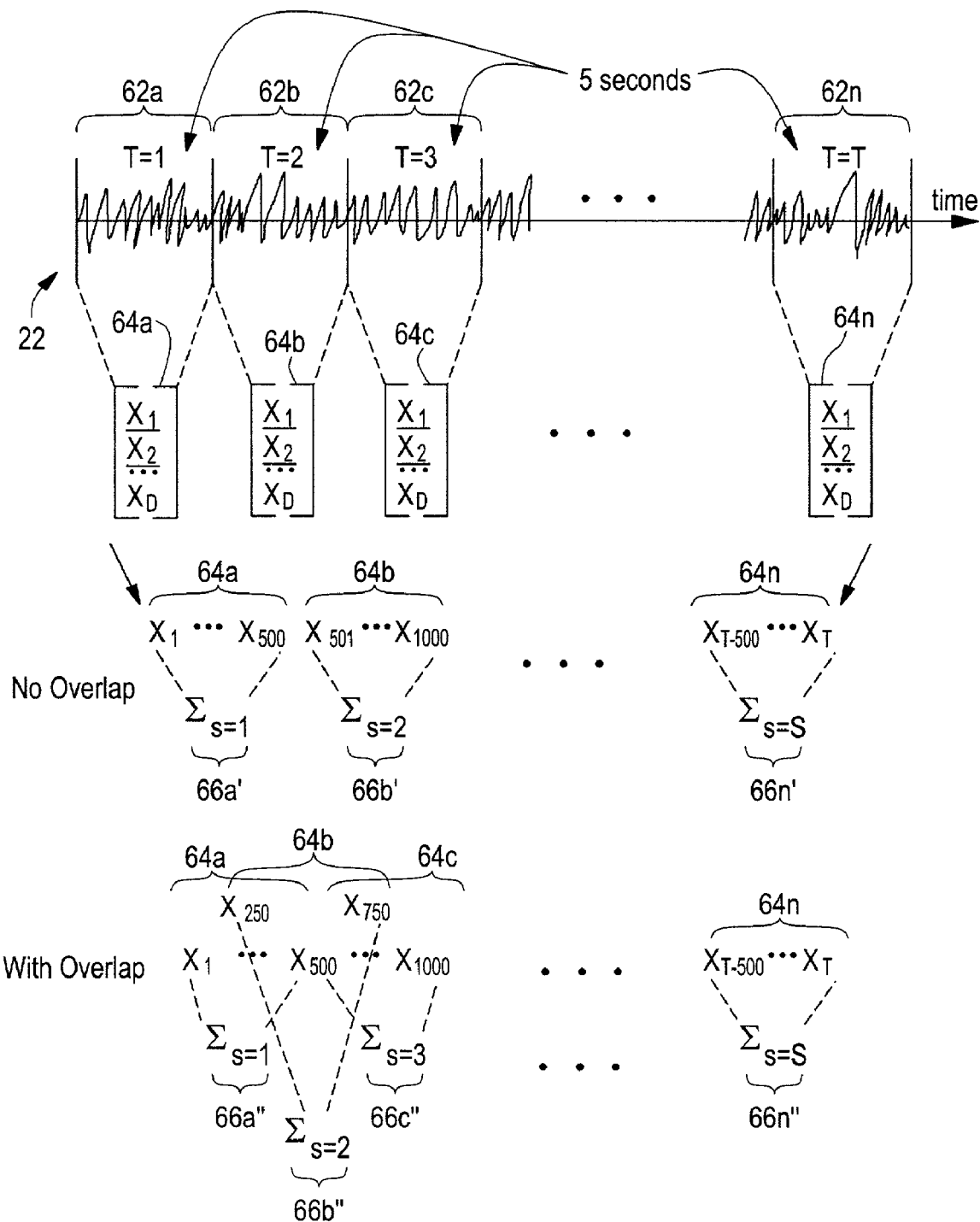

FIGS. 3a and 3b show an example of covariance matrix processing (i.e., signature 40 generation) as disclosed in FIG. 2. Referring to FIG. 3a, the A/V stream 22 from the transmitted signal is subdivided into a plurality of segments 62a–62n, corresponding to time intervals t=1 through t=T, respectively. Each of the segments 62a–62n includes a plurality of samples represented as a sequence vector set 64a–64n of respective vectors $x_1$–$x_D$, each vector being generated from a sample of the transmission stream 22. In a particular embodiment each of the time intervals is 5 seconds of transmission time, and each of the samples is 1/100th of a second, hence there are 500 samples in a segment 62. Each of the vectors $x_1$–$x_D$ in the sequence vector sets 64a–64n is correlated with the other vectors $x_1$–$x_D$ in the sequence vector set 64a–64n to produce a covariance matrix 66a–66n, or signature, indicative of the respective sequence of vectors from the transmitted segment.

FIG. 3b shows covariance matrix processing in more detail employing sequence vector sets derived from overlapping and non-overlapping segments of samples. Referring to FIG. 3b, two alternate sequences of signatures are shown. A first sequence 66a'–66n' includes signatures 66 derived from non-overlapping sequence vector sets of samples, and corresponds to the signature sequence 66a–66n of FIG. 3a. The signatures 66a'–66n' are derived from non-overlapping sequence vector sets of samples, each sequence vector set 64a–64n including 500 contiguous samples from the transmission stream 22 as shown by the subscripts of the vectors $x_1$–$x_D$, when D=500. Each contiguous 500 samples comprises a sequence vector set 64a–64n, Specifically, signature 66a' is derived from samples $x_1$–$x_{500}$, signature 66b' is derived from samples $x_{501}$–$x_{1000}$, and continuing to signature 66n', which is derived from samples $x_{T-500}$–$x_T$.

Continuing to refer to FIG. 3b, the sequence of signatures 66a"–66n" includes signatures derived from overlapping segments 62a–62n of samples. In this example, each segment includes 500 samples which overlap 250 samples with the adjacent sequence vector set 64. Therefore, signature 66a" is derived from samples $x_1$–$x_{500}$, however, signature 66b" is derived from samples $x_{250}$–$x_{750}$ signature 66c" is derived from samples $x_{501}$–$x_{1000}$, and continuing to signature 66n", derived from samples $x_{T-500}$–$x_T$. Accordingly, the overlap processing derives more signatures but requires additional storage.

Figure 4:
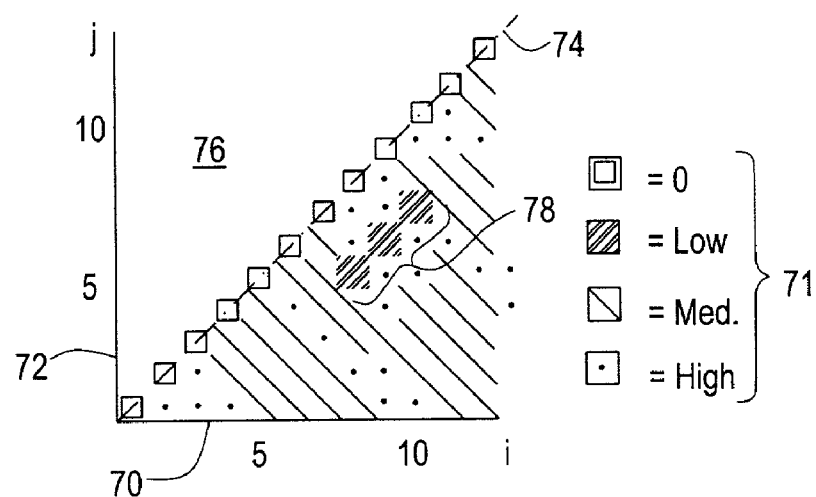
FIG. 4 is a graphical illustration of a distance matrix.

Each covariance matrix 66a–66n can be represented as a vector in the multidimensional space, and may be compared to another vector to generate a distance value. As indicated above, the distance value is proportional to the similarity between the transmitted segments 62a–62n, i.e., the closer in distance, and hence the lower in distance values, the greater the similarity between segments 62. FIG. 4 shows a distance matrix of distance values from a transmission stream 22 compared to itself. Referring to FIG. 4, the distance values are shown graphically according to a four-tier scale 71. A zero distance value between compared segments 62 is illustrated by squares on the scale 71. A low distance value between compared segments 62 is illustrated by hatch marks on the scale 71. A medium distance value is illustrated by diagonal lines, and a high distance value (i.e. a large dissimilarity) between compared segments 62 is illustrated by closed filled circle (dots) in the scale 71. A horizontal axis i 70 and a vertical axis j 72 each represent the same sequence of segments 62. Each graphed point (i,j) indicates the distance between element i in the sequence to element j in the sequence. Since the streams being compared are the same, the upper half 76 is symmetrical with the lower half and is therefore not computed. A main diagonal, shown by dotted line 74, and illustrated by squares on the scale 71, has distance values of zero, which is typical when a stream is compared to itself.

Each element, or point (i,j), in the matrix, therefore, is compared to each other element to generate a distance value. The example shown employs four tiers of distance values 71, illustrated graphically, each corresponding to different distance threshold values. Varying numbers of tiers and thresholds may be employed. As indicated above, in the example shown, the main diagonal has a distance value threshold of zero and generally is observed only when a segment is compared to itself. The low distance value tier has a threshold which allows distances that are sufficiently close to be considered a match, such as less than 0.5 or less than 1.0, depending on the application. Since the elements/matrix points (i,j) each represent sequential segments 62, a matching sequence appears as a diagonal 78 of low distance values parallel to the main diagonal. Further, the diagonal 78 includes a sequence of a minimum number of segments corresponding to a minimum length of a repetition. In the example shown, the segments correspond to five seconds of transmission time, or transmission interval, therefore the diagonal 78 indicates a 15 second transmission. Other transmission intervals corresponding to an expected duplicate transmission time could be employed, such as 20 or 30 seconds, described further below.

The low distance value tier threshold and the minimum number of repeated segments for a match define the granularity of the system. As described above, the product of the segment size (transmission interval) and the minimum number of segments gives the minimum duration of a repeated segment found by the system. If the segment size is too large, the beginning of a repeated segment may not be detected until the following segment, and may be missed altogether if there is insufficient overlap. Similarly, if the minimum number of segments is too large, a shorter sequence of actual repetition may not be detected, possibly from only a portion of an advertisement having been sampled. Conversely, if the minimum number of segments or the segment size are too small, repetitions may be indicated from trivial commonalities. In each case, the low distance tier threshold affects the degree of similarity, and therefore the likelihood of a near miss or trivial match, and may be employed to tune the sensitivity of the system accordingly.

Figure 5:
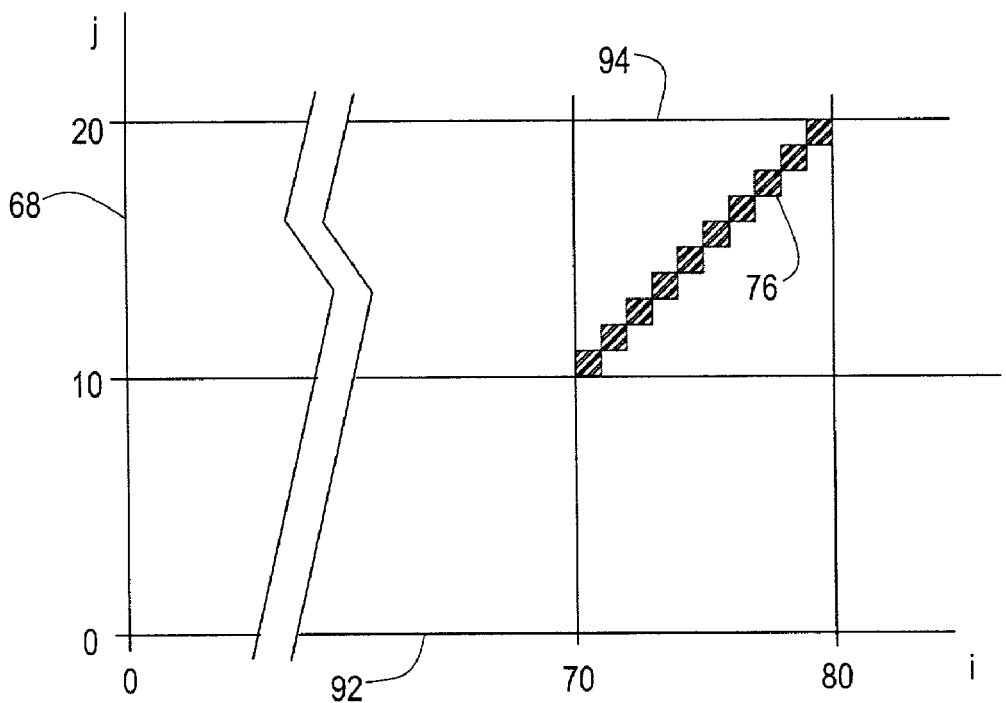
FIG. 5 is an illustration of matching of sequences in a distance matrix.

The sequence of covariance matrices 66 corresponding to the transmitted stream may be compared to sequences of covariance matrices stored in the database 46 (FIG. 2) of previous transmissions, as well as to itself. FIG. 5 shows the matching of different sequences of covariance matrices. Referring to FIG. 5, a j axis 68 corresponds to increments of time of the transmitted stream 22 (FIG. 2). An i axis 92 corresponds to a sequence of covariance matrices from the library 46 of previous transmissions found to be repetitive. Since the covariance matrices from the transmitted stream are compared to a like number of covariance matrices representing a potential match, each axis of the compared segments represents the same number of segments, although not necessarily the same position in the sequence, as in the self distance matrix of FIG. 4.

In the example shown, segments 10–20 of the transmitted sequence 68 are compared to segments 70–80 of the library stream 92. This comparison is shown in region 94, in which a diagonal match 96 is found. The sequence of library segments shown by the i axis 92 may be of various sizes, depending on the number of previously found sequences and the available computing resources.

Figure 6:
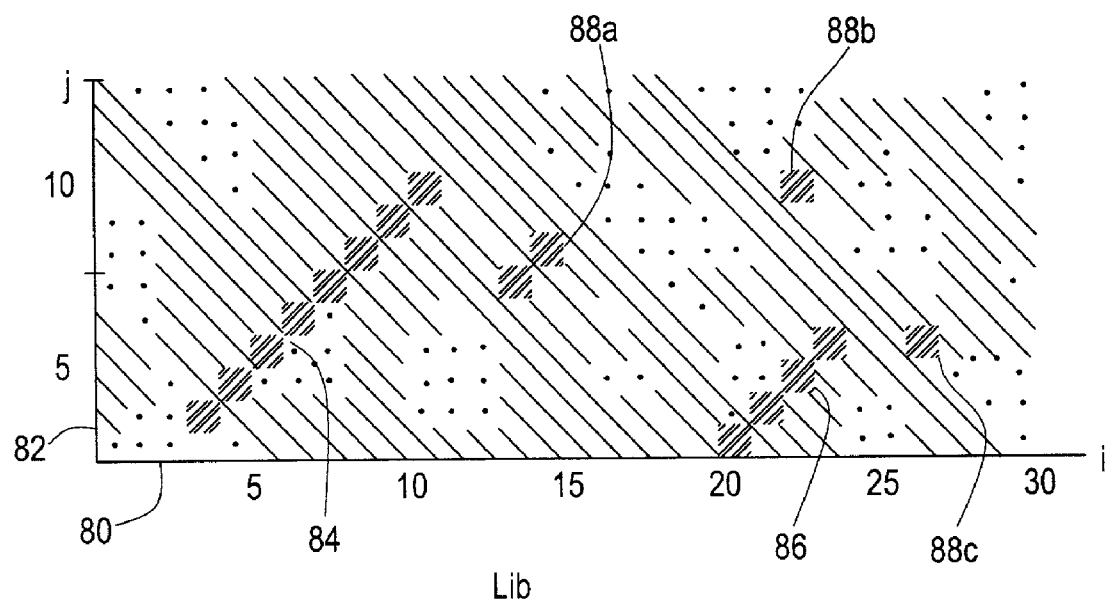
FIG. 6 is an illustration of a distance matrix derived from a library.

FIG. 6 shows an example of the invention repetition detection using a distance matrix of a transmitted stream and a library stream. Referring to FIG. 6, an i axis 80 corresponds to the library sequence, and a j axis 82 corresponds to the subject transmitted stream. Since the sequence of matrices is not being compared to itself, the axes are of unequal length and there is no main diagonal of zero distance, as illustrated above with respect to FIG. 4. A diagonal sequence 84 of low distance values illustrates a matching sequence. The sequence 84 includes eight (8) elements, indicating a repetitive transmission 40 seconds (8*5 seconds/element) in total duration. Another diagonal sequence 86 includes four elements, starting from the first element in the transmitted stream. Accordingly, 20 seconds are represented which may be only a partial sequence depending on the previous segments from the transmitted stream. Other matrix elements illustrating low distance values 88a–88c are either one or two elements in length. The minimum number of segments serves to remove apparent duplicates of a duration shorter than the non-trivial matches which are sought, such as the minimum duration of an advertisement. Accordingly, matches of such short duration may not be indicative of a meaningful match and therefore, are not taken to indicate repetitions in the transmission stream.

Figure 7A:
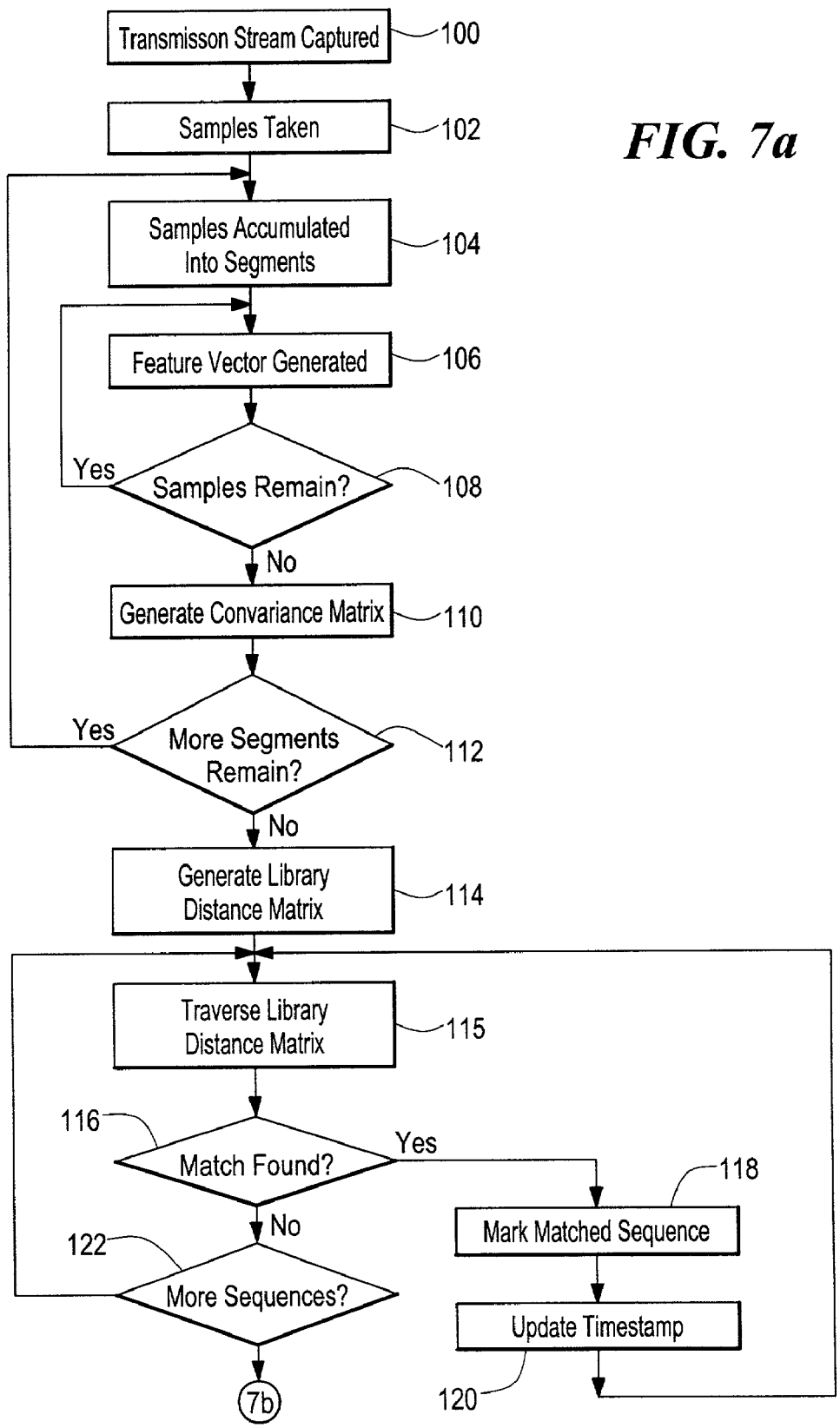
FIGS. 7a and 7b are flowcharts of repetition detection processing of the present invention.
Figure 7B:
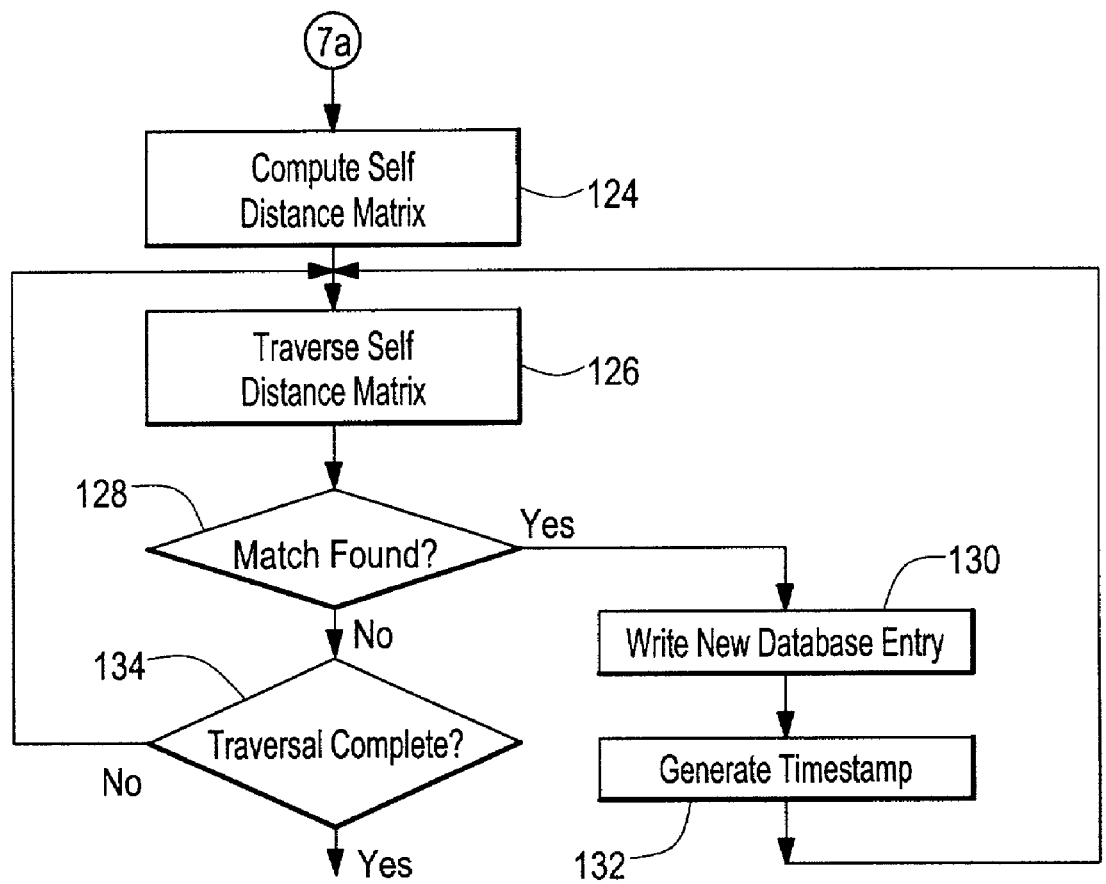

FIGS. 7a and 7b shows a flowchart of the duplicate detection routine of the present invention. Referring to FIGS. 7a, 2 and 3, a new transmission stream 22 of A/V data is captured for duplication detection, as illustrated at step 100. Samples 32 of a predetermined sampling interval are taken from the stream 22, as shown at step 102. The samples 32 are accumulated into segments (FIG. 2, 36; FIG. 3a, 62), each segment 36 representing a minimal transmission interval, such as 5 seconds, as depicted at step 104. For each sample 32 in the segment 36, a feature vector ($x_1$–$x_D$ in FIG. 3a) is generated indicative of the sample 32, as disclosed at step 106, to produce a sequence vector set (64a–64n in FIG. 3a). As described above with respect to FIGS. 3a and 3b, the feature vectors $x_1$–$x_D$ may correspond to either overlapping or non-overlapping sequence vector sets, depending on the indices of $X_{(d)}$. A check is performed to determine if any samples remain in the current segment 36, as shown at step 108. When all vectors ($x_1$–$x_D$ in FIG. 3a) have been determined for the segment 36, a covariance matrix (66a–66n in FIG. 3a) is generated by correlating all the vectors in the sequence vector set (64a–64n) corresponding to the segment, as shown at step 110. The covariance matrix 66n is a signature 40 which tends to be uniquely indicative of the transmitted segment, and therefore is unlikely to yield a match against dissimilar transmissions. A check is performed to determine if more segments (36 FIG. 2, 62 FIG. 3a) remain in the transmitted stream 22, as disclosed at step 112, and control reverts to step 104, until the sequence of covariance matrices 66a–66n (FIG. 3a) corresponding to the transmitted stream 22 is completed. The sequence is then compared to the library 46 (FIG. 2) of sequences of previously found repetitions, and a library distance matrix generated, as depicted at step 114. The library distance matrix is generated first, before the self-distance matrix, so that found repetitions need not be searched again with respect to the self-distance matrix.

The library distance matrix is traversed to find diagonal sequences of low distance values, as depicted at step 115. A check is performed to see if a match is found in the library, as shown at step 116. If a match was found, then the matched sequence is marked in the transmitted stream 22, as disclosed at step 118, to avoid redundant searching in the self-match traversal. A time stamp in the library entry corresponding to the matched sequence is updated, as shown at step 120. As indicated above, the timestamp serves to keep the library entries from becoming stale. A predetermined timestamp threshold is employed to determine when entries are considered obsolete, such as one month. Other timestamp threshold values could be employed depending on the application. If there are more library sequences to compare, control reverts to step 115 to check the remaining sequences, as depicted at step 122.

Referring to FIG. 7b, after the library distance matrix has been traversed, the self distance matrix is computed by comparing the sequence of covariance matrices (generated through step 112) minus any matched sequence portions marked in step 118 to itself and generating the self distance matrix, as depicted at step 124. The self distance matrix is traversed to find diagonals of low distance values for at least the minimum threshold length, as shown at step 126. As indicated above, only the bottom half of this distance matrix is traversed since it is symmetrical across the main diagonal. A check is performed, to see if a matching sequence is found, as shown at step 128. If a match was found, the matching sequence is then written as a new entry to the library database of known sequences, as depicted at step 130. A timestamp is generated and stored with the entry, as disclosed at step 132. The timestamp is employed as described above with successive library matches. In an alternate embodiment, the self-distance matrix could be generated and traversed first, and the library database 46 traversed to find matches which are already known, in which case only the timestamp would be updated. A check is performed to see if the traversal is complete, as shown at step 134, otherwise control reverts to step 126 to find successive diagonals.

While this invention has been particularly shown and described with references to preferred embodiments thereof, it will be understood by those skilled in the art that various changes in form and details may be made therein without departing from the scope of the invention encompassed by the appended claims. Accordingly, the invention is not intended to be limited except by the following claims.

What is claimed is:

1. A method of matching sequences of signals from an information stream comprising:
   extracting a stream of samples from a subject information stream, each of the extracted samples comprising a portion of the information stream;
   computing, for each of the samples, a vector quantity indicative of the data in the sample;
   correlating the vectors to generate a signature indicative of the stream of samples;
   comparing the generated signatures to signatures generated from a match stream of samples using a distance metric to generate distance values;
   generating, as a result of the comparing, a distance matrix containing entries of the distance values and indicative of signatures generated from similar samples;
   traversing the distance matrix to determine if a similar distance value sequence is found;
   querying, when a similar distance value sequence is found in the distance matrix, a library of previously found distance value sequences;
   storing the distance value sequence in the library if a match is not found as a result of the querying;
   updating, if a match is found as a result of the querying, a timestamp corresponding to the matching distance value sequence in the library;
   traversing the distance value sequences in the library;
   examining each of the timestamps of the distance value sequences; and
   purging, when the timestamp is beyond a predetermined threshold, the distance value sequence corresponding to the timestamp.

2. The method of claim 1 wherein correlating includes generating the signature distinctively from signatures generated for other streams of samples.

3. The method of claim 1 wherein the correlating generates a covariance matrix as a signature indicative of the stream of samples.

4. The method of claim 1 further comprising arranging the samples into a plurality of segments.

5. The method of claim 1 wherein each of the extracted samples comprises a predetermined interval of the subject information stream.

6. The method of claim 1 wherein the match stream is the extracted stream of samples itself.

7. The method of claim 1 wherein the match stream is indicative of a predetermined sequence of samples stored from previously transmitted samples.

8. The method of claim 7 wherein signatures corresponding to the predetermined sequence are stored in a library.

9. A method of detecting repetitions in an information stream comprising:
   providing an information stream of multimedia data corresponding to a transmitted signal;
   extracting a plurality of samples from the information stream;
   accumulating the samples into segments comprising a predetermined interval of the transmitted signal;
   generating respective vectors indicative of the samples in each of the segments;
   for each segment, correlating the vectors in the segments to generate a respective covariance matrix corresponding to the segment;
   aggregating each of the covariance matrices corresponding to the segments into a sequence of covariance matrices;
   comparing each of the covariance matrices in the sequence with each other covariance matrix in the sequence to generate a distance matrix;
   traversing the distance matrix to determine if a similar distance value sequence is found;
   querying, when a similar distance value sequence is found in the distance matrix, a library of previously found distance value sequences;
   storing the distance value sequence in the library if a match is not found as a result of the querying;
   updating, if a match is found as a result of the querying, a timestamp corresponding to the matching distance value sequence in the library;
   traversing the distance value sequences in the library;

examining each of the timestamps of the distance value sequences; and purging, when the timestamp is beyond a predetermined threshold, the distance value sequence corresponding to the timestamp.

10. The method of claim 9 wherein generating the distance matrix further comprises generating a distance value, indicative of the similarity between the distance matrices, as a result of the comparing.

11. The method of claim 9 further comprising traversing the distance matrix to determine similar sequences of covariance matrices.

12. The method of claim 11 wherein determining similar sequences further comprises searching for diagonals of similar distance values.

13. The method of claim 12 wherein searching for diagonals of similar distance values includes searching for distance values within a predetermined threshold.

14. The method of claim 9 wherein the covariance matrices correspond to a multidimensional space and comparing the covariance matrices further comprises:
determining, for each of the covariance matrices, a location in the multidimensional space; and
computing a distance value indicative of the distance between the covariance matrices in the multidimensional space.

15. The method of claim 14 further comprising ranking the distance values and storing the ranking in the distance matrix.

16. The method of claim 15 wherein a matching sequence is determined by similar diagonal values in the distance matrix.

17. The method of claim 16 wherein the similar diagonal values form a contiguous sequence for a predetermined number of locations in the distance matrix.

18. The method of claim 14 wherein the multidimensional space further comprises at least 39 dimensions.

19. The method of claim 9 wherein the information stream further comprises streaming audio or video.

20. A system for detecting repetitions in an information stream comprising:
a stream processor operable to extract a stream of samples from the subject information stream and further operable to arrange the samples into a plurality of segments, each of the samples comprising a portion of the information stream;
a segment processor operable to receive the segments and to compute, for each sample in the segments, a vector indicative of the data in the sample;
a correlator operable to correlate each of the vectors in at least one of the segments to generate a signature indicative of the segment;
a distance processor responsive to the correlator and operable to compare the signature to signatures generated from a match stream of samples using a distance metric to generate distance values, and further operable to generate, as a result of the comparing, a distance matrix containing entries of the distance values and indicative of signatures generated from similar samples in the match stream;
means for traversing the distance matrix to determine if a similar distance value sequence is found;
means for querying, when a similar distance value sequence is found in the distance matrix, a library of previously found distance value sequences;
means for storing the distance value sequence in the library if a match is not found as a result of the querying;
means for updating, if a match is found as a result of the querying, a timestamp corresponding to the matching distance value sequence in the library;
means for traversing the distance value sequences in the library;
means for examining each of the timestamps of the distance value sequences; and
means for purging, when the timestamp is beyond a predetermined threshold, the distance value sequence corresponding to the timestamp.

21. The system of claim 20 wherein the signature generated by the correlator is distinctive from signatures generated from other samples.

22. The system of claim 21 wherein the signature is a covariance matrix.

23. The system of claim 20 wherein each of the segments comprises a predetermined interval of the information stream.

24. The system of claim 20 wherein the match stream is the stream of samples itself.

25. The system of claim 20 wherein the match stream is indicative of a predetermined sequence of samples stored from previously transmitted samples.

26. The system of claim 25 wherein the signature corresponding to the predetermined sequence is stored in a library.

27. A computer program product encoded in a tangible computer readable medium having computer program code for matching sequences of signals from an information stream comprising: computer program code for extracting a stream of samples from a subject information stream, each of the extracted samples comprising a portion of the information stream; computer program code for computing, for each of the samples, a vector quantity indicative of the data in the sample; computer program code for correlating the vectors to generate a signature indicative of the stream of samples, computer program code for comparing the generated signatures to signatures generated from a match stream of samples using a distance metric to generate distance values, computer program code for generating, as a result of the comparing, a distance matrix containing entries of the distance values and indicative of signatures generated from similar samples, computer program code for traversing the distance matrix to determine if a similar distance value sequence is found; computer program code for querying, when a similar distance value sequence is found in the distance matrix, a library of previously found distance value sequences, computer program code for storing the distance value sequence in the library if a match is not found as a result of the querying; computer program code for updating, if a match is found as a result of the querying, a timestamp corresponding to the matching distance value sequence in the library; computer program code for traversing the distance value sequences in the library; computer program code for examining each of the timestamps of the distance value sequences; and computer program code for purging, when the timestamp is beyond a predetermined threshold, the distance value sequence corresponding to the timestamp.

28. A system for detecting repetitions in an information stream comprising:
means for extracting a stream of samples from a subject information stream, each of the extracted samples comprising a portion of the information stream;

means for computing, for each of the samples, a vector quantity indicative of the data in the sample;

means for correlating the vectors to generate a signature indicative of the stream of samples;

means for comparing the generated signatures to signatures generated from a match stream of samples using a distance metric to generate distance values;

means for generating, as a result of the comparing, a distance matrix containing entries of the distance values and indicative of signatures generated from similar samples;

means for traversing the distance matrix to determine if a similar distance value sequence is found;

means for querying, when a similar distance value sequence is found in the distance matrix, a library of previously found distance value sequences;

means for storing the distance value sequence in the library if a match is not found as a result of the querying;

means for updating, if a match is found as a result of the querying, a timestamp corresponding to the matching distance value sequence in the library;

means for traversing the distance value sequences in the library;

means for examining each of the timestamps of the distance value sequences; and means for purging, when the timestamp is beyond a predetermined threshold, the distance value sequence corresponding to the timestamp.

* * * * *

UNITED STATES PATENT AND TRADEMARK OFFICE
CERTIFICATE OF CORRECTION

| | |
|---|---|
| PATENT NO. | : 7,065,544 B2 |
| APPLICATION NO. | : 09/997731 |
| DATED | : June 20, 2006 |
| INVENTOR(S) | : Pedro J. Moreno |

It is certified that error appears in the above-identified patent and that said Letters Patent is hereby corrected as shown below:

In column 3, line 26, delete "0transmission" and insert -- transmission --, therefor.

Signed and Sealed this

Twenty-second Day of December, 2009

David J. Kappos
*Director of the United States Patent and Trademark Office*